United States

3,399,210
Aug. 27, 1968

3,399,210
PHOSPHONAMIDOTHIOATE COMPOUND
Paul B. Budde and Henry Tolkmith, Midland, Mich., assignors to The Dow Chemical Company, Midland, Mich., a corporation of Delaware
No Drawing. Original application Apr. 29, 1965, Ser. No. 452,004, now Patent No. 3,264,179, dated Aug. 2, 1966. Divided and this application Jan. 5, 1966, Ser. No. 518,772
7 Claims. (Cl. 260—309)

ABSTRACT OF THE DISCLOSURE

Novel compounds of the formula

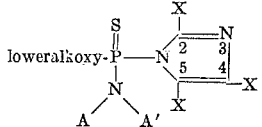

wherein each X independently represents hydrogen, loweralkyl or phenyl, the total number of carbon atoms in all X substituents being 15 or less, A represents lower alkyl or A' and each A' independently represents benzyl, furfuryl or tetrahydrofurfuryl. The compounds are used to control fungi such as organisms causing leaf spot, apple scab, powdery mildew, and late blight.

CROSS REFERENCE TO RELATED APPLICATION

This is a division of our copending application Ser. No. 452,004, filed Apr. 29, 1965, now U.S. Patent 3,264,179.

The present invention is concerned with imidazolyl phosphonamidothioate compound of the formula

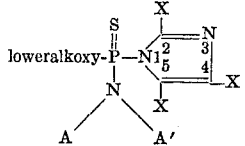

In the above and succeeding formula, each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl. In the present specification and claims, the terms "imidazolyl phosphonamidothioate compound" and "imidazolyl phosphonamidothioate compounds" are employed to designate only a compound or compounds of this formula, herein above. The term "imidazolyl" is employed to refer only to a moiety of the formula

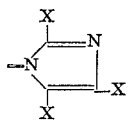

The term "loweralkyl" is employed in the present specification and claims to designate an alkyl radical being of from 1 to 4, both inclusive, carbon atoms.

The novel products of the present invention are liquids or crystalline solid materials which are somewhat soluble in many common organic solvents and of very low solubility in water. They exhibit the advantageous and highly desirable combination of high fungitoxicity and low mammalian toxicity and are therefore very useful in the control of fungal organisms.

The novel compounds of the present invention are prepared by either of two methods. In a preferred method, the compounds are prepared by reacting a phosphoramidochloridothioate having the formula

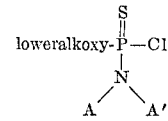

with an imidazole compound of the formula

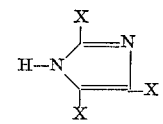

in the presence of a hydrogen chloride acceptor. The hydrogen chloride acceptor can be any organic tertiary amine, or the imidazole compound can be employed both as reactant and as hydrogen chloride acceptor.

The reaction conveniently is carried out in an inert organic liquid as reaction medium. Suitable liquids include the hydrocarbons, such as benzene, toluene, xylene, and cyclohexane; and ethers, such as diethyl ether, 1,2-dimethoxyethane, and tetrahydrofuran. It is generally preferred to avoid the use, as reaction medium, of any organic liquid which has a reactive hydrogen, because its use may result in side reactions.

While the precise amounts of the materials employed are not critical, it is preferred to employ substantially equimolecular proportions of the imidazole compound, phosphoramidochloroidothioate, and hydrogen chloride acceptor. When imidazole compound is employed both as reactant and as hydrogen chloride acceptor, good results are obtained when employing one molecular proportion of phosphoramidochloridothioate and two molecular proportions of imidazole compound.

The reaction takes place smoothly in the temperature range of 0° to 60° C. with the production of the desired product and hydrogen chloride by-product, which appears as the hydrogen chloride salt of the hydrogen chloride acceptor. In carrying out the reaction, the reactants are mixed and contacted together in any convenient fashion. Thereafter, the resulting mixture is maintained for a period of time in the reaction temperature range, preferably with stirring or other mechanical agitation of the mixture. Following the completion of the reaction, the reaction mixture can be employed for the useful purposes of the present invention. However, in many applications of the present invention, it is preferred to separate the desired product compound from the reaction mixture. This is accomplished by conventional procedures. Most typically the by-product hydrogen chloride salt is removed from the reaction mixture by filtration to obtain a product-containing filtrate. Organic liquid serving as reaction medium is removed from this filtrate by evaporation under subatmospheric pressure to thereby separate the product. The separated product can be used with out purification or can be purified by conventional procedures such as solvent extraction, and, in the instance of products which are solids, recrystallization.

In an alternative procedure, the imidazolyl phosphonamidothioate compounds can be prepared by reacting a phosphorodichloridothioate having the formula

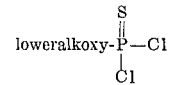

with an imidazole compound as previously defined, to form an intermediate imidazolyl phosphorochloridothioate having the structure

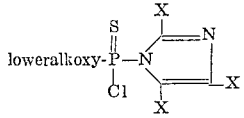

This intermediate is thereafter reacted with an amine reactant of the formula

to produce the desired imidazolyl phosphonamidothioate compound. The reactions conveniently are carried out in a reaction medium of the sort employed in the procedure hereinabove. Each step of this reaction procedure is carried out in the presence of a hydrogen chloride acceptor. An organic tertiary amine can be employed as hydrogen chloride acceptor, or the imidazole compound or amino reactant, respectively, can be employed both as reactant and as hydrogen chloride acceptor. Good results are obtained when employing, in the first reaction, substantially equimolecular proportions of phosphorodichloridothioate, imidazole compound, and hydrogen chloride acceptor, and, in the second reaction, substantially equimolecular proportions of intermediate imidazolyl phosphorochloridothioate, amine reactant, and hydrogen chloride acceptor. The reactants are carried out at temperatures of from 0° C. to 60° C. The temperature can be controlled by regulating the rate of mixing and contacting the reactants together and by external cooling. The by-product in both steps of the reaction is hydrogen chloride, which appears as the hydrogen chloride salt of the hydrogen chloride acceptor employed. Following the reaction, the desired product can be separated in accordance with the conventional procedures as previously described.

In the preparation procedures hereinabove discussed, the imidazolyl moiety is introduced by reaction of a phosphorus-containing compound, as variously defined, with the imidazole compound, as defined. The imidazole compound ordinarily occurs as a tautomeric form in which no hydrogen is fixably positioned at any given ring-nitrogen atom. Accordingly, in the reaction of many of these reactants, in the methods hereinabove presented, isomeric products are produced. The products can be separated by such conventional separation procedures as chromatographic separation and fractional crystallization.

The following examples illustrate the best methods now known for the practice of the present invention and will enable those skilled in the art to practice the present invention.

Example 1.—O-ethyl P-imidazol-1-yl-N-furfuryl-N-methyl phosphonamidothioate

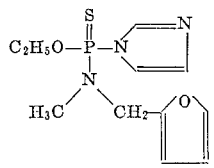

O-ethyl N-furfuryl-N-methyl phosphoramidochloridothioate (254 grams; 1.0 mole) is mixed with 1 liter of benzene. To the resulting mixture, 136 grams of imidazole (2.0 moles) are added portionwise to the mixture over about five hours. The addition is carried out with the reaction mixture at a temperature of about 25° C. After the completion of the addition, the reaction mixture is stirred for twelve hours at a temperature of 24–26° C. Thereafter, the reaction mixture is filtered to separate the by-product imidazole hydrochloride salt, the by-product salt washed with three 250-milliliter portions of benzene, and the filtrate and wash liquor combined and concentrated by evaporation of benzene under sub- atmospheric pressure to yield O-ethyl P-imidazol-1-yl-N-furyfuryl-N-methyl phosphonamidothioate. The product is a liquid.

Other representative products of the present invention are the following:

| Name of product: | Identifying property, M.W. |
|---|---|
| O-methyl P-(2-methylimidazol-1-yl)-N-benzyl-N-tert-butyl phosphonamidothioate | 337.4 |
| O-ethyl P-(4,5-diphenylimidazol-1-yl)-N-isopropyl-N-furfuryl phosphonamidothioate | 465.6 |
| O-n-butyl P-(2-methyl-4,5-diphenylimidazol-1-yl)-N-benzyl-N-ethyl phosphonamidothioate | 503.7 |
| O-ethyl P-imidazol-1-yl-N-methyl-N-(tetrahydrofurfuryl) phosphonamidothioate | Liquid |
| O-isobutyl P-(4,5-di-n-propylimidazol-1-yl)-N-methyl-N-(tetrahydrofurfuryl) phosphonamidothioate | 401.6 |
| O-sec-butyl P-(2-ethylimidazol-1-yl)-N-furfuryl-N-n-propyl phosphonamidothioate | 369.5 |
| O-n-propyl P-(2-n-butylimidazol-1-yl)-N-benzyl-N-tetrahydrofurfuryl phosphonamidothioate | 435.6 |
| O-ethyl P-imidazol-1-yl-N-benzyl-N-methyl phosphonoamidothioate | Liquid |
| O-ethyl P-(2-phenylimidazol-1-yl)-N,N-difurfuryl phosphonamidothioate | 427.5 |
| O-isopropyl P-(2-methyl-4,5-di-n-propylimidazol-1-yl)-N,N-bis(tetrahydrofurfuryl) phosphonamidothioate | 471.6 |
| O-ethyl P-imidazol-1-yl-N,N-dibenzyl phosphonamidothioate | 371.5 |
| O-ethyl P-(4(and 5)-methylimidazol-1-yl)-N-benzyl-N-methyl phosphonamidothioate | 309.4 |

It has been discovered that the present imidazolyl phosphonamidothioate compounds are adapted to be employed for the control of a wide range of fungi, especially those fungal organisms ordinarily found on the aerial portions of plants, such as, for example, cherry leaf spot, apple scab, rice blast, powdery mildew, Helminthosporium (leaf spot on grasses, cereals, and corn), and late blight. The compounds can also be applied in dormant applications to the woody surfaces of plants or to orchard floor surfaces for the control of the over-wintering spores of many fungi. In addition, the imidazolyl phosphonamidothioate compounds can be applied to seeds to protect the seeds from the attack of fungal organisms such as rot and mildew. Also, the compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric-materials, or in oil or latex paints, to prevent mold, mildew, and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew and decay. The foregoing environments are merely illustrative of the many habitats in which these agents can be distributed to obtain excellent fungal control.

In the fungicidal application of the imidazolyl phosphonamidothioate compounds, the unmodified materials can be employed. However, the compounds can also be employed together with a parasiticide adjuvant to obtain a liquid, powder or dust composition containing one or more of the toxicants. Such compositions are adapted to be applied to the living plants without substantial injury to the plants. In preparing toxicant compositions, the imidazolyl phosphonamidothioate compounds can be modified with one or more of a plurality of additaments including organic solvents, petroleum distillates, water or other liquid carriers, surface active dispersing agents, and finely divided inert solids. In such compositions, the imidazolyl phosphonamidothioate compound toxicants oftentimes are present in a concentration from about 2 to 98 percent by weight. Depending upon the concentration in the composition of the imidazolyl phosphonamidothioate compound, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

The exact concentration of the imidazolyl phosphonamidothioate compound employed in the compositions for application to the fungal organism and/or its habitat can vary provided a fungicidal dosage of toxicant is applied either on the organism or its environment. This dosage of toxicant is dependent in part upon the susceptibility of the particular organism to the particular compound employed. In general, good results are obtained with liquid compositions containing from about 0.0001 to 2.0 percent by weight of toxicant; in some operations, however, compositions containing as much as from 2 to 98 percent by weight are conveniently employed, as, for example, in applications to orchard floor surfaces for the control of spores. With dusts, good results are usually obtained with compositions containing from 0.001 to 2.0 percent or more by weight of toxicant. In some instances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the imidazolyl phosphonamidothioate compounds are applied to plots or growing plants at a dosage of from 0.004 to 3 or more pounds per acre.

The phosphoramidochloridothioate compounds employed as starting products in the preparation of the compounds of the present inventions are prepared by known procedures. In these procedures, thiophosphoryl chloride, which has the formula

is reacted successively in either order or simultaneously with (1) a lower alkanol of the formula loweralkoxy-H and with (2) an amine compound having the formula

the latter reaction being carried out in the presence of a hydrogen chloride acceptor. The hydrogen chloride acceptor can be an organic tertiary amine or the amine compound, as above defined, can be employed both as reactant and as hydrogen chloride acceptor. Good results are obtained when employing the materials in amounts which represent equimolecular proportions of thiophospheryl chloride, lower alkanol, amine compound, and hydrogen chloride acceptor. Conveniently the reaction is carried out in an inert organic liquid as reaction medium, such as, for example, diethyl ether, benzene, carbon tetrachloride, or methylene chloride.

The present application is directed to and concerned with the disclosure and claiming of the invention as described hereinbefore. The present application is also directed to the disclosure and claiming of the invention in compounds, methods, or compositions, comprising or employing any subgeneric group or class of imidazolyl phosphonamidothioate compounds which may be obtained by any permutation or combination of the alternative expressions in the several compound definitions to be found hereinbefore.

We claim:
1. Compound of the formula

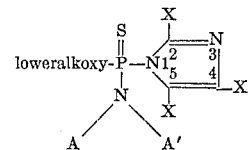

wherein each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl.

2. The compound of claim 1 wherein loweralkoxy represents ethoxy, A represents methyl, A' represents benzyl, and each X represents hydrogen, corresponding to O-ethyl P-imidazol-1-yl-N-benzyl-N-methyl phosphonamidothioate.

3. The compound of claim 1 wherein loweralkoxy represents ethoxy, A represents methyl, A' represents furfuryl, and each X represents hydrogen, corresponding to O - ethyl P - imidazol - 1 -yl - N - furfuryl - N - methyl phosphonamidothioate.

4. The compound of claim 1 wherein loweralkoxy represents ethoxy, A represents methyl, A' represents (tetrahydrofurfuryl), and each X represents hydrogen, corresponding to O-ethyl N-imidazol-1-yl-N-methyl-N-(tetrahydrofurfuryl) phosphonamidothioate.

5. The compound of claim 1 wherein loweralkoxy represents ethoxy, each of A and A' represents furfuryl, X at the 2-position represents, phenyl, and each remaining X represents hydrogen, corresponding to O-ethyl P-(2-phenylimidazol - 1 - yl) - N,N - difurfuryl phosphonamidothioate.

6. The compound of claim 1 wherein loweralkoxy represents n-butoxy, A represents ethyl, A' represents benzyl, X at the 2-position represents methyl, and each remaining X represents phenyl, corresponding to O-n-butyl P - (2 - methyl- 4,5 - diphenylimidazol - 1 - yl) - N-benzyl-N-ethyl phosphonamidothioate.

7. The compound of claim 1 wherein loweralkoxy represents isopropoxy, each of A and A' represents (tetrahydrofurfuryl), X at the 2-position represents methyl, and each remaining X represents n-propyl, corresponding to O-isopropyl P-(2-methyl-4,5-di-n-propylimidazol-1-yl)-N,N-bis(tetrahydrofurfuryl) phosphonamidothioate.

References Cited

UNITED STATES PATENTS 3,111,525   11/1963   Meltzer et al. _____ 260—309

JOHN D. RANDOLPH, Primary Examiner.

NATALIE TROUSOF, Assistant Examiner.